Aug. 16, 1960   J. VAN POOL   2,949,347
HYDROCARBON CONVERSION REACTION VESSEL
Filed June 13, 1958   2 Sheets-Sheet 1
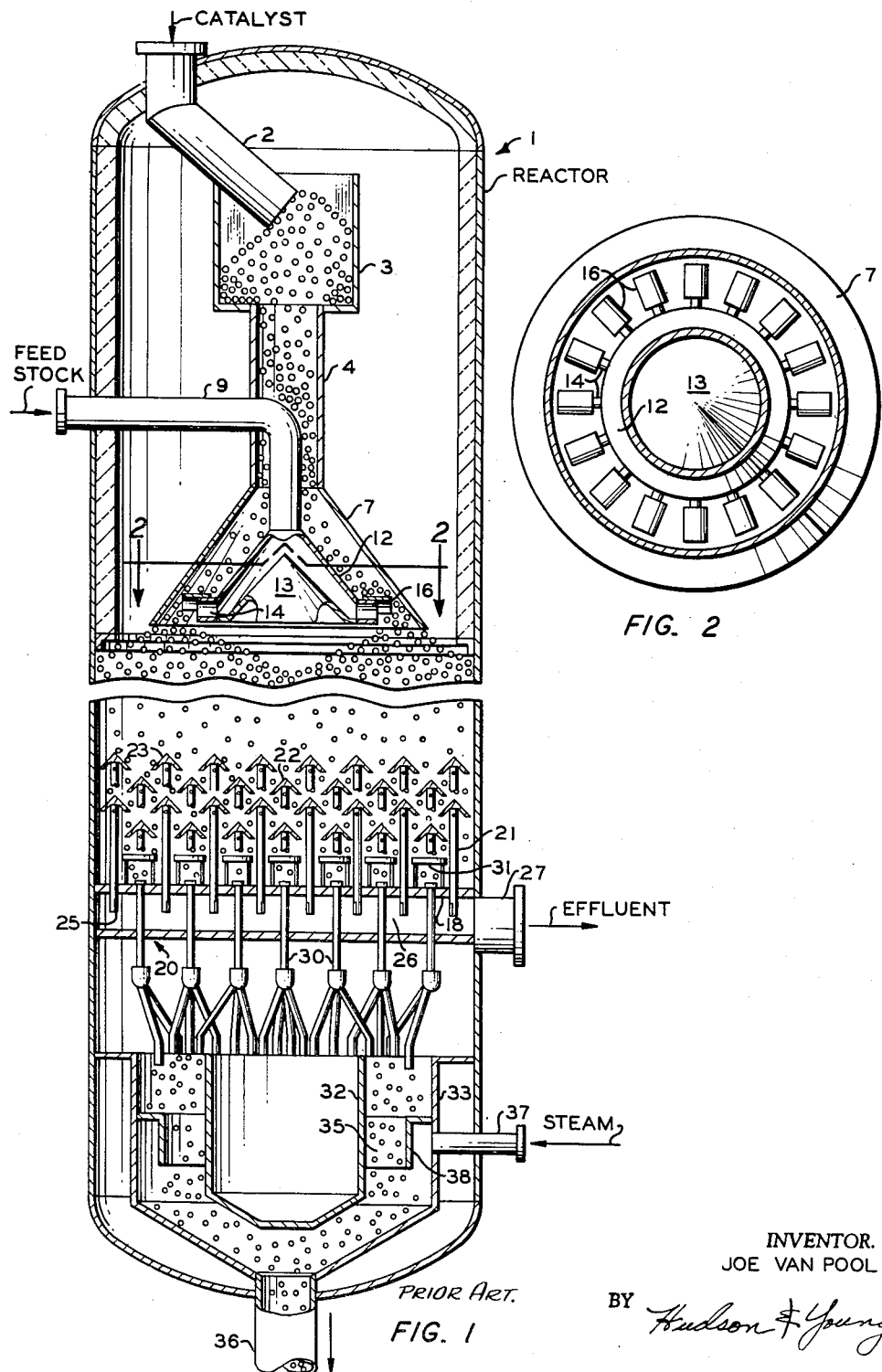
FIG. 2
PRIOR ART.
FIG. 1
INVENTOR.
JOE VAN POOL
BY
ATTORNEYS

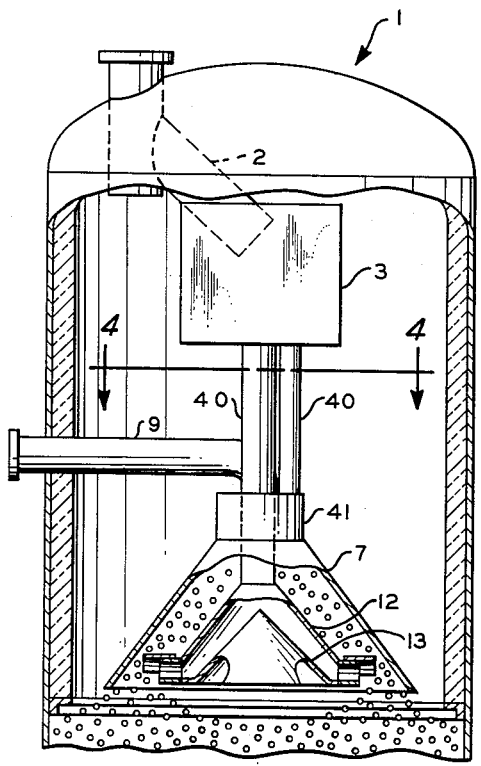
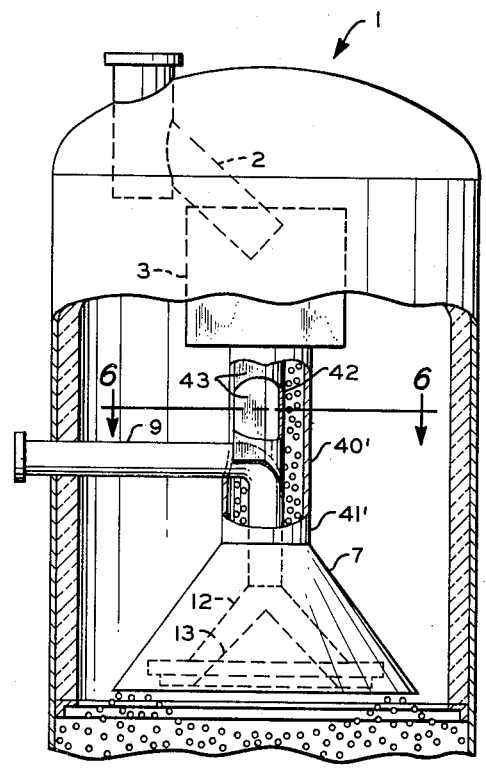
FIG. 3    FIG. 5
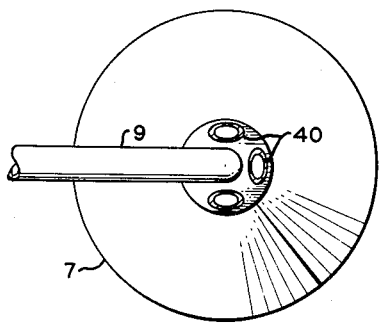
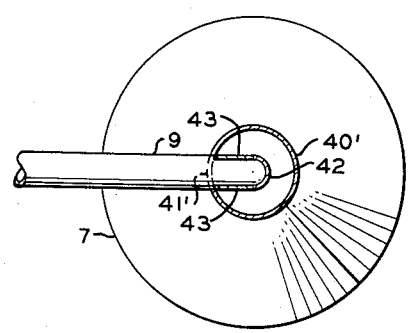
FIG. 4    FIG. 6
INVENTOR.
JOE VAN POOL
BY Hudson & Young
ATTORNEYS

United States Patent Office 2,949,347
Patented Aug. 16, 1960

2,949,347

HYDROCARBON CONVERSION REACTION VESSEL

Joe Van Pool, Bartlesville, Okla., assignor to Phillips Petroleum Company, a corporation of Delaware Filed June 13, 1958, Ser. No. 741,919

4 Claims. (Cl. 23—288)

This invention relates to an improved hydrocarbon conversion reaction vessel. In a more particular aspect, the invention relates to an improved apparatus for introducing solids and feed into the conversion zone of such reaction vessel.

One widely employed method of converting hydrocarbons to more valuable products involves their high temperature conversion by passing the feed hydrocarbons downwardly through a downwardly gravitating bed of particulate solid particles as heat carriers. In one modification known to the art the feed stock is sprayed or atomized into an opening within a freely falling curtain of the catalyst. One disadvantage of this method, as pointed out in U.S. 2,492,998, is the fact that some of the atomized feed stock penetrates the curtain of catalyst and sticks to the reactor wall, resulting in the deposition of coke thereon. This problem is substantially avoided by arrangements such as are shown in U.S. 2,789,889 or in Figure 1 herein, wherein the feed material is injected downwardly through a hooded outlet which is surrounded by a downwardly gravitating mass of solid catalyst particles. It has been found, however, that in the otherwise successful operation of the apparatus shown in Figure 1, rather serious and expensive erosion problems are encountered.

It is an object of the invention, therefore, to provide an improved hydrocarbon reaction vessel wherein hydrocarbons are contacted with a moving bed of hot particulate solids. It is a further object of the invention to provide an improved solids and feed introduction apparatus wherein erosion difficulties are minimized.

According to the present invention, an improved feeder is provided for distributing feed stock to be converted within a downwardly moving bed of particulate catalyst, the particular structure allowing the introduced feed to be surrounded by a gravitating bed of particulate solids while at the same time avoiding the high points of erosion resulting from the simultaneous abrupt change of direction of solids flow and restriction of area of flow of solids.

Figure 1 is a vertical view, partially in cross-section, showing the arrangement of apparatus, including the pebble and feed stock feeding mechanism, in a commercial gravitating moving bed catalytic reactor. Figure 2 is a plan view showing the feeder taken along line 2—2 of Figure 1. Figure 3 is a vertical view, partially in cross-section, of the upper portion of such a gravitating bed catalytic reactor showing an improved feed stock and pebble feeding arrangement according to the invention, while Figure 4 is a plan view of the feeder taken along line 4—4 of Figure 4. Figure 5 is also a vertical view, partially in cross-section, of the upper portion of such a reactor showing another improved feeding mechanism of the invention, while Figure 6 is a plan view of the feeder taken along line 6—6 of Figure 5.

Referring to Figures 1 and 2 together, regenerated catalyst in the form of pebbles or beads is introduced into the reactor 1 via downleg 2, surge chamber 3 and downleg 4, flowing out from deflector cone 7 into the cylindrical portion of reactor 1. Feed material to be converted, usually liquid or vapor hydrocarbons, or both, along with steam is introduced via conduit 9 into the reactor, said conduit entering the side of downleg 4 and curving in the shape of an elbow at approximately a right angle so as to extend into the lower portion of cone 7. The feedstock is passed from conduit 9 into the section defined by inner cones 12 and 13, and thence out via radial outlets 14. These outlets can be of the same length or can alternate in short and long lengths to distribute the feed more evenly. Also, perforations can be used in between the radial outlets. The undersides of outlets 14 can be slotted or perforated for further distribution purposes, as desired. To prevent outlets 14 from opening directly into the solids (which results in a high pressure drop) there is mounted a shield or covering 16 over the outlet end of these radially mounted conduits which deflects catalyst particles and forms a sheltered space below for discharge of feedstock. The frustrum of a cone 7 desirably has an angle greater than the dynamic angle of repose of the solids (30–40°) in order to produce the desired downward flow of solids thereunder.

The falling catalyst forms a compact bed supported by a horizontal grid plate 18. A plurality of spaced vapor disengager tubes 21 extend through grid 18 with their lower ends terminating a short distance below it. Each disengager is covered by an inverted cup-shaped member 22 or angle iron which acts as an umbrella, permitting the vapors, along with some catalyst fines, to be drawn in through orifices 23 without obstruction from the main catalyst mass. Disengagers 21 are notched near their base to form discharge ports 25 through which vapors are discharged into the vapor space 26 between grid 18 and lower plate 20 for passage through effluent nozzle 27 to suitable fractionating means not shown.

Catalyst is drawn off from the catalyst bed into the underlying stripping section through a plurality of downcomer pipes 30. Downcomers 30 are partly covered by members 31 to provide a funneling action for the passing of catalyst particles thereto and to prevent bridging of the catalyst bed over the tops of the downcomers.

The stripping section consists mainly of two concentric hoppers 32 and 33, the intervening space being divided into a number of cells 35. Each catalyst downcomer pipe 30 discharges into an individual cell. Inner hopper 32 tapers to a conical base as does hopper 33, the latter discharging into standpipe 36 for passage into the regeneration zone. Catalyst particles pass through the cells 35 as a plurality of compact columns and are stripped therein by steam entering the reactor through line 37 and discharging into hopper 33. Baffle ring 38 projecting from the inner wall of cylinder 33 forces the incoming steam downwardly and toward the center of cells 35; from this point it flows up through the individual cells. Stripped catalyst is withdrawn from the reactor into standpipe 36. The fines, together with stripped hydrocarbon vapors, are entrained by the stripping steam passing through the several cells and collect, in part, within inner hopper 32.

In commercial operation of the apparatus of Figure 1, it has been found that excessive erosion occurs not only at the elbow of conduit 9 through which feedstock is introduced, but also in the wall of conduit 4 where this conduit surrounds conduit 9. I have discovered that the high rate of erosion in conduit 4 is apparently caused by the increased lateral force exerted by the pebbles or catalyst particles when forced to go around conduit 9 at a point where the restriction of the area of flow causes an increased velocity of particle flow.

Based upon my observations I have invented an improved feeder mechanism or arrangement of apparatus, two embodiments of which are shown, respectively, in Figures 3 and 5.

In Figures 3 and 5 I have shown only the upper portions of a reactor containing the feeding mechanism of the invention. The lower portions of the reactor can be the same or different in their details than shown in Figure 1 below the broken line thereof. The construction of the feedstock and catalyst feeder arrangement in Figures 3 through 6 results in the elimination of the conditions leading to high abrasion which I have observed in operation of the apparatus of Figures 1 and 2.

In Figures 3 to 6 parts which have a similar function as corresponding parts of Figures 1 and 2 are given the same number and are not further described.

In the embodiment of the invention shown in Figures 3 and 4 contact of the catalyst while it is flowing from surge chamber 3 down to the space defined by cones 7 and 12, with the elbow portion of conduit 9 is avoided by providing three conduits 40 extending between chamber 3 and short cylindrical conduit 41 which communicates at its other end with the top of frustrum of cone 7 and which is of substantially the same diameter as the top of the frustrum of the cone. The pipes 40 are arranged substantially around three sides of an annulus around the vertical portion of conduit 9. By this construction there is avoided contact of pebbles with the upper surfaces of the curved portion of the elbow-shaped inlet conduit 9, and there is also avoided a structure by which down-flowing pebbles are caused to increase in velocity at the same time a sudden lateral force is exerted on the pebbles because of being forced to change their direction of flow. The conduits 40 have been shown, but one or more conduits can be employed and such conduits can be in any suitable shape. For instance, such a conduit can even be a single conduit generally in the shape of a portion of an annular cylinder. The embodiment shown in Figures 5 and 6 is a refinement or extension of this last-mentioned structure. In these figures 41' connects at its lower end to the top of frustrum of cone 7 and is a full cylinder which blends into and connects with at its upper end to conduit 40'. Conduit 40' is generally in the shape of approximately three-quarters of an annulus surrounding three sides or about 270° of conduit 9. A particular way in which this arrangement can be constructed which is shown in Figures 5 and 6 is to take a conduit of the diameter of conduit 41' which extends all the way from frustrum 7 to surge chamber 3 and then cut a slot the width of conduit 9 all the way to the top of conduit 40'—41'. The bottom of this slot is semi-circular and cut to fit the outside radius of conduit 9. Then to make the other walls of conduit 40' a half of a cylinder 42 cut from a pipe of the same diameter as conduit 9 is superimposed on the vertical portion of conduit 9, as shown. Then two flat plates 43 are extended between member 42 and the front of the slot cut in 40', plates 43 are then welded to 40' and to member 42. Members 42 and 43 on their outer edges or surfaces at the bottom extend from a point tangent to the circumference of pipe 9 and are also welded thereto. By this construction, pebbles flowing down the complete conduit 40' cannot contact the upper surfaces of the elbow portion of conduit 9, that is, the surfaces seen from a plan view of conduit 9.

As a specific example of the structure of the invention the following dimensions are used in vessels constructed in accordance with Figures 3 to 6: Line 9, 14 inch inside diameter; lines 40, elliptical shaped conduits 8 inches by 11 inches inside diameter; reactor 1, height 51 feet 9 inches, inside diameter 11 feet, 5 inches; conduits 41 and 41', inside diameter 2 feet, 6 inches; distance between the top of frustrum 7 and the bottom of surge chamber 3, 13 feet, 2 inches; slope of frustrum of cone 7, 45°.

Reactor 1 of the invention can be used for a number of conversions employing either catalytic pebbles or non-catalytic heat transfer pebbles, and finds particular use in the conversion of hydrocarbons. Particularly important is the catalytic or thermal cracking of hydrocarbons such as a topped crude employing pebbles or beads of an acid-treated clay catalyst. The unit can also be used to effect catalytic reforming, dehydrogenation, desulfurization, etc.

As a specific example of the invention, using the apparatus of Figures 3 and 4 and a silica-alumina catalyst in the form of $3/16$ inch beads circulated at the rate of 240 tons per hour at an initial temperature entering downpipe 2 of 1015° F., fresh feed gas oil from distillation of Rangely crude oil having an API gravity of 35 is introduced at a rate of about 6000 barrels per day through conduit 9 in the form of about 90 percent vapor and 10 percent liquid, along with about 4000 barrels per day of recycle product cycle oil, making a total hydrocarbon feed of 10,000 barrels per day. The feed is introduced at a temperature of approximately 730° F. The conversion is about 70 percent by volume and the effluent is about 5 weight percent light gases, 8 volume percent $C_3$–$C_4$ hydrocarbon stream, largely olefins, 60 volume percent gasoline and 30 volume percent cycle oils.

As will be evident to those skilled in the art, various modifications of this invention can be made or followed in the light of the foregoing disclosure and discussion without departing from the spirit or scope of the disclosure or from the scope of the claims.

I claim:

1. In combination with a reaction vessel that has conduit means for feeding materials thereinto and for removing materials therefrom, an improved construction of apparatus for disposition inside said reaction vessel comprising a first frusto-conically shaped hollow member disposed with its axis in a vertical direction and with the larger end lowermost; a second frusto-conically shaped hollow member with its larger end lowermost and its axis extending vertically, disposed coaxially within and being smaller than said first member, to thereby define an annular flow passage between said members; a chamber disposed above said first and second frusto-conically shaped hollow members; an elbow-shaped conduit comprising a horizontal portion that extends outside of said vessel and that is disposed at a level between the upper end of said first member and said chamber, and a vertical portion disposed coaxially with said first and second frusto-conically shaped hollow members that is connected between said horizontal portion and the upper end of said second frusto-conically shaped hollow member; the smaller upper end of said first frusto-conically shaped hollow member being disposed above the uppermost end of said second frusto-conically shaped hollow member to thereby define an annular space between the former and said vertical portion of said elbow-shaped conduit; and a vertically extending conduit means, surrounding at least a part of the vertical portion of said elbow-shaped conduit, for connecting said chamber to the upper end of the said first frusto-conically shaped hollow member, having a uniform cross-section of smaller area than said annular space extending vertically down from said chamber to at least the level where said elbow-shaped conduit extends horizontally and that increases to the cross-sectional area of said annular space between said level and said upper end of said first frusto-conically shaped hollow member; said elbow-shaped conduit being one of said conduit means for feeding materials.

2. In combination with a reaction vessel that has conduit means for feeding materials thereinto and for removing materials therefrom, an improved construction of apparatus for disposition inside said reaction vessel comprising a first frusto-conically shaped hollow member disposed with its axis in a vertical direction with the larger end lowermost; a second frusto-conically shaped hollow member with its larger end lowermost and its axis extending vertically, disposed coaxially within and being smaller than said first member, to thereby define an annular flow passage between said members; the smaller upper end of said first member being disposed above the uppermost end of said second member; a chamber disposed above said first and second frusto-conical members; an elbow-shaped conduit comprising a horizontal portion that extends outside of said vessel and that is disposed at a level between the upper end of said first member and said chamber, and a vertical portion disposed coaxially with said second frusto-conically shaped hollow member that is connected between said horizontal portion and the upper end of said second frusto-conically shaped hollow member; said elbow being one of said conduit means for feeding materials; said vertical portion of said elbow-shaped conduit and said upper end of said first frustro-conically shaped member defining an annular space therebetween; and a vertically extending conduit means connecting the upper end of said first frustro-conically shaped hollow member in communication with said chamber, surrounding the vertical portion of said elbow, and defining an uninterrupted vertical flow path of a horizontal cross-section between said horizontal portion of said elbow and said chamber that corresponds in shape to said annular space with the horizontal cross-section of said horizontal portion of said elbow removed therefrom at a location in alignment with said horizontal portion.

3. In combination with a reaction vessel that has conduit means for feeding materials thereinto and for removing materials therefrom, an improved construction of apparatus for disposition inside said reaction vessel comprising a first frustro-conically shaped hollow member disposed with its axis in a vertical direction with the larger end lowermost; a second frustro-conically shaped hollow member with its larger end lowermost and its axis extending vertically, disposed coaxially within and being smaller than said first member, to thereby define an annular flow passage between said members; the smaller upper end of said first member being disposed above the uppermost end of said second member; a chamber disposed above said first and second frusto-conical members; an elbow-shaped conduit comprising a horizontal portion that extends outside of said vessel and that is disposed at a level between the upper end of said first member and said chamber, and a vertical portion disposed coaxially with said second frusto-conically shaped hollow member that is connected between said horizontal portion and the upper end of said second frusto-conically shaped hollow member; said elbow being one of said conduit means for feeding materials; said vertical portion of said elbow-shaped conduit and said upper end of said first frustro-conically shaped member defining an annular space therebetween; and a vertically extending conduit means connected between said chamber and the upper end of said first member for defining an uninterrupted vertical flow path therebetween and for excluding entirely from said flow path the region disposed vertically above said elbow and between the horizontal portion of said elbow and said chamber.

4. In combination with a reaction vessel that has conduit means for feeding materials thereinto and for removing materials therefrom, an improved construction of apparatus for disposition inside said reaction vessel comprising a first frustro-conically shaped hollow member disposed with its axis in a vertical direction with the larger end lowermost; a second frustro-conically shaped hollow member with its larger end lowermost and its axis extending vertically, disposed coaxially within and being smaller than said first member, to thereby define an annular flow passage between said members; the smaller upper end of said first member being disposed above the uppermost end of said second member; a chamber disposed above said first and second frusto-conical members; an elbow-shaped conduit comprising a horizontal portion that extends outside of said vessel and that is disposed at a level between the upper end of said first member and said chamber, and a vertical portion disposed coaxially with said second frustro-conically shaped hollow member that is connected between said horizontal portion and the upper end of said second frusto-conically shaped hollow member; said elbow being one of said conduit means for feeding materials; said vertical portion of said elbow-shaped conduit and said upper end of said first frustro-conically shaped member defining an annular space therebetween; a first straight vertical conduit with a horizontal cross-section corresponding to said annular space that surrounds a portion of said vertical portion of said elbow-shaped conduit and that extends from the uppermost end of said first frustro-conically shaped member to a level below the level of said horizontal portion of said elbow-shaped conduit; at least one second straight vertical conduit extending vertically and connecting said first straight conduit to said chamber, said second straight conduit having throughout its length an uninterrupted vertical flow path of a uniform horizontal cross-sectional area that is less than the horizontal cross-sectional area of said annular space.

References Cited in the file of this patent

UNITED STATES PATENTS

| | | |
|---|---|---|
| 2,469,332 | Evans | May 3, 1949 |
| 2,534,625 | Robinson | Dec. 19, 1950 |
| 2,623,842 | Robinson | Dec. 30, 1952 |
| 2,842,430 | Bishop | July 8, 1958 |